United States Patent Office 3,264,352
Patented August 2, 1966

3,264,352
PREPARATION OF N,N'-DIARYLBENZIDINES
Cecil C. Chappelow, Jr., and Richard L. Elliott, Kansas City, Mo., assignors to Allied Chemical Corporation, New York, N.Y., a corporation of New York
No Drawing. Filed Feb. 10, 1964, Ser. No. 343,496
6 Claims. (Cl. 260—576)

This invention relates to an improved method for the preparation of N,N'-diarylbenzidines and more particularly to their preparation by the disproportionation of symmetrical diaryldiphenylsulfamides in the presence of sulfuric acid.

Heretofore, N,N'-diarylbenzidines were prepared in low yields by the oxidation of the corresponding diarylamine, by direct alkylation of benzidine, by the rearrangement of the proper diarylhydrazine or diarylhydroxylamine, or by some other multi-step process.

Nitrogen-substituted benzidines are very important both as intermediates and products in the pharmaceutical and dye-stuff industries and as antioxidants in the rubber industry.

An object of this invention is to provide a novel and effective process for the preparation of N,N'-diarylbenzidines. A further object is to provide a process for the preparation of N,N'-diarylbenzidines by the disproportionation of symmetrical diaryldiphenylsulfamides. Other objects and advantages will become apparent hereinafter.

In accordance with the invention, N,N'-diarylbenzidines are produced by admixing a symmetrical diaryldiphenylsulfamide with sulfuric acid and then cooling. We have discovered that N,N'-diarylbenzidines can be produced in nearly quantitative yields by sulfuric acid catalyzed disproportionation of symmetrical diaryldiphenylsulfamides. Furthermore, it was found that the disproportionation is not subject to general acid catalysts, but that it is specifically catalyzed by sulfuric acid. Other acids, such as nitric, hydrochloric, hydrofluoric, phosphoric, or acetic acids, are not effective in catalyzing the reaction.

The process of this invention is illustrated by the following generalized equation:

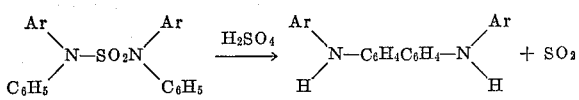

wherein Ar is an aryl or substituted aryl group, such as an alkaryl group, which is free of substituents sensitive to acid. The aryl radical can have 1 to 3 benzene rings, the preferred number being either 1 or 2 benzene rings. Examples are phenyl, indanyl, naphthyl, biphenylyl, anthryl, phenanthryl. The aryl radical can be substituted with the following substituents: alkyl, alkoxy, aryloxy, alkylthio, arylthio, and dialkylamino. The number of carbons in the alkyl portion of the substituent can be from 1 to 20 and is preferably from 1 to 10. The number of benzene rings in the aryl portion of the substituent can be the same as noted supra for the principal aryl radical.

Symmetrical diaryldiphenylsulfamides can be prepared by admixing the sodium salt of an arylphenylamine, suspended in xylene, with sulfuryl fluoride, in a molar ratio of 2:1, under reflux in a temperature range of 20° to 200° C. for 1 to 30 hours. The reaction mixture is then cooled, filtered, and the filtrate evaporated to dryness, after which the residue is recrystallized from isopropyl alcohol or petroleum ether.

The process is carried out by admixing in a reaction vessel, 1 part by weight of a symmetrical diaryldiphenylsulfamide with 1 to 5 parts by weight of sulfuric acid, the weight of the sulfuric acid based on that of concentrated sulfuric acid. The sulfuric acid is preferably concentrated but can be 30 to 35 N. The dissolution of the sulfamide in sulfuric acid can take from 15 minutes to 15 hours, but usually takes from 30 minutes to 5 hours. The temperature is generally held within a range of about 0°–100° C. and preferably within a range of about 15°–45° C. This is accomplished by external cooling means such as a water jacket, or a Dry Ice bath. Agitation is effective in aiding dissolution, but is not necessary. A clear solution, which is usually deep green or blue in color, is obtained. For best results, this clear solution should be cooled to a temperature of about 60° to −30° C. and preferably to about 30° to 0° C. The cooling can be accomplished by the external cooling means referred to above, but is preferably accomplished by pouring the clear solution over ice. Cracked ice is more effective than cubes or large pieces of ice in view of its greater surface area. Other internal cooling means can also be used such as the addition of liquid nitrogen. This cooling compensates for the heat of dilution which can be accomplished simultaneously with cooling or subsequently to cooling.

Dilution of the clear solution with water must be used to complete the reaction and isolate the product; i.e., the dilution causes the crude N,N'-diarylbenzidine compounds to precipitate. Since ice accomplishes both cooling and dilution simultaneously, it is preferred; however, dilution of the acid-sulfamide solution can be from about 1 part by weight of acid-sulfamide solution to about 20 parts of water to 5 parts by weight of acid-sulfamide solution to about 10 parts by weight of water. The amount of dilution is not critical and will be apparent because at that point a precipitate will begin to form. Dilution is continued until no more precipitate forms, but excessive dilution will not defeat the recovery of the precipitate. Stirring is also helpful in the formation of the precipitate, but it is not required. The precipitate is then filtered off and can then be washed with a dilute base such as sodium hydroxide or sodium bicarbonate and water and air dried. To obtain a pure product, the precipitate can then be recrystallized from solvents such as methanol or benzene.

The following compounds are typical but non-limiting examples of products produced by the process of this invention: N,N' - diphenylbenzidine, N,N' - bis(4 - methylphenyl)benzidine, N,N'-bis(2-naphthyl)benzidine, N,N'-bis(4-methoxyphenyl)benzidine, N,N'-bis(4-nitrophenyl)benzidine, N,N'-bis(4-t-butylphenyl)benzidine, N,N'-bis(2,4 - dimethylphenyl)benzidine, N,N' - bis(3 - trifluoromethylphenyl)benzidine, N,N' - bis(4 - dimethylaminophenyl)benzidine.

The following examples, wherein parts and percentages are by weight, are illustrative of the process of this invention.

*Example I.—N,N'-diphenylbenzidine*

Into a reaction vessel containing 50 parts of concentrated sulfuric acid, 20 parts of tetraphenylsulfamide was added in small portions over a ½ hour period. The acid-sulfamide mixture was stirred vigorously while the temperature was maintained at 30° C. The resultant clear bright-blue solution was poured over 200 parts of cracked ice and mixed thoroughly. The dilute acid solution was filtered and the filter cake washed with dilute sodium hydroxide followed by washing with water. The precipitate was recrystallized from a large volume of methanol to obtain 18 parts (a 90 percent yield) of the final product, C.P. 248–250° C. A mixed melting point with an authentic sample of N,N'-diphenylbenzidine was undepressed and the infrared spectra of the product and the authentic sample were undistinguishable.

*Example II.—N,N'-bis(4-methylphenyl)benzidine*

While rapidly stirring 60 parts of concentrated sulfuric acid, 15 parts of 1,3-bis(4-methylphenyl)-1,3-diphenylsulfamide was added in small portions at 25° C. over a 15 min. period. After addition, the mixture was stirred for an additional 15 min. at 25° C. The clear dark-green solution was poured over 300 parts of cracked ice and stirred vigorously. The resultant dilute acid mixture was filtered to recover the white flocculent precipitate. After washing the filter cake several times with sodium bicarbonate solution and water, it was pressed dry. The partially dry, crude product was recrystallized from a large volume of methanol and a 95 percent yield of final product was obtained. The final product was a light-tan crystalline solid, M.P. 231–233° C. N,N'-bis(4-methylphenyl)benzidine is reported to have a melting point of 233° C. (Beilstein, 13, II, 99).

*Example III.—N,N'-bis(2-naphthyl)benzidine*

To 20 parts of concentrated sulfuric acid contained in a reaction vessel equipped with a means for stirring, temperature control and solid addition, 5 parts of 1,3-bis(2-naphthyl)-1,3-diphenylsulfamide was added in small portions with vigorous stirring. During the 15 min. addition period, the temperature was maintained at 40° C. The resultant greenish-blue acid solution was poured into 100 parts of cracked ice and the mixture was agitated vigorously. The flocculent tan precipitate was filtered off and washed with sodium bicarbonate solution and several times with water. The crude product was air dried and recrystallized from benzene to obtain 4 parts (an 80 percent yield) of a tan crystalline solid M.P. 235–238° C. A melting point of 238–239° C. is reported for N,N-bis(2-naphthyl)benzidine (Beilstein, 13, 224).

We claim:

1. A process for the preparation of N,N'-diarylbenzidines comprising (a) forming a solution of a symmetrical diaryldiphenylsulfamide compound with sulfuric acid, and (b) diluting said solution with water until a precipitate is formed.

2. The process as defined in claim 1 wherein dilution of the solution is accompanied by cooling.

3. The process as defined in claim 1 wherein the product is N,N'-diphenylbenzidine and the symmetrical diaryldiphenylsulfamide compound is tetraphenylsulfamide.

4. The process as defined in claim 1 wherein the product is N,N'-bis(4-methylphenyl)benzidine and symmetrical diaryldiphenylsulfamide is 1,3-bis(4-methylphenyl)-1,3-diphenylsulfamide.

5. The process as defined in claim 1 wherein the product is N,N'-bis(2-naphthyl)benzidine and the symmetrical diaryldiphenylsulfamide is 1,3-bis(2-naphthyl)-1,3-diphenylsulfamide.

6. A process for the preparation of a N,N'-diarylbenzidine which comprises (a) admixing a symmetrical diaryldiphenylsulfamide having the structural formula

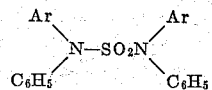

wherein Ar is a phenyl, indanyl, naphthyl, biphenylyl, anthryl or phenanthryl radical or an alkyl, alkoxy, aryloxy, alkylthio, arylthio or dialkylamino substituted derivative thereof with sulfuric acid to form a solution and (b) diluting said solution with water to precipitate the desired N,N'-diarylbenzidine.

No references cited.

CHARLES B. PARKER, *Primary Examiner*.

ROBERT V. HINES, *Assistant Examiner*.